W. H. LYMAN.
MUZZLE AND CALF WEANER.
APPLICATION FILED JUNE 15, 1905.
949,730.
Patented Feb. 15, 1910.
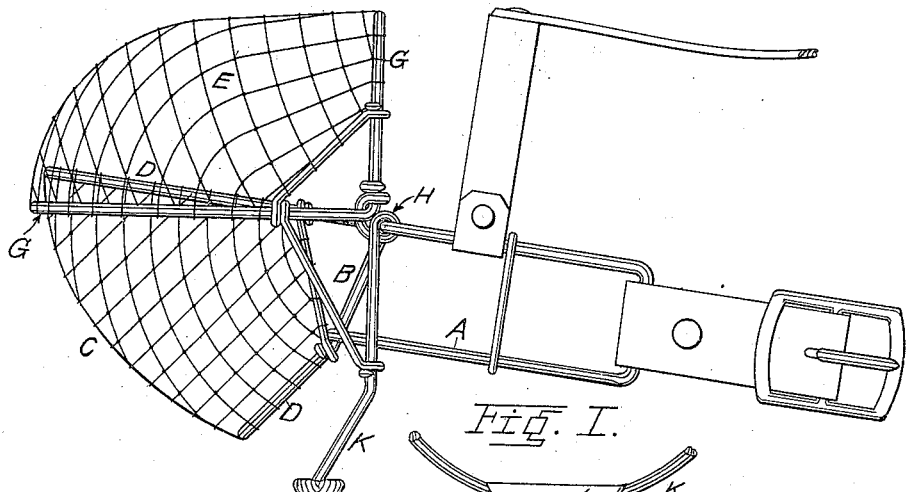
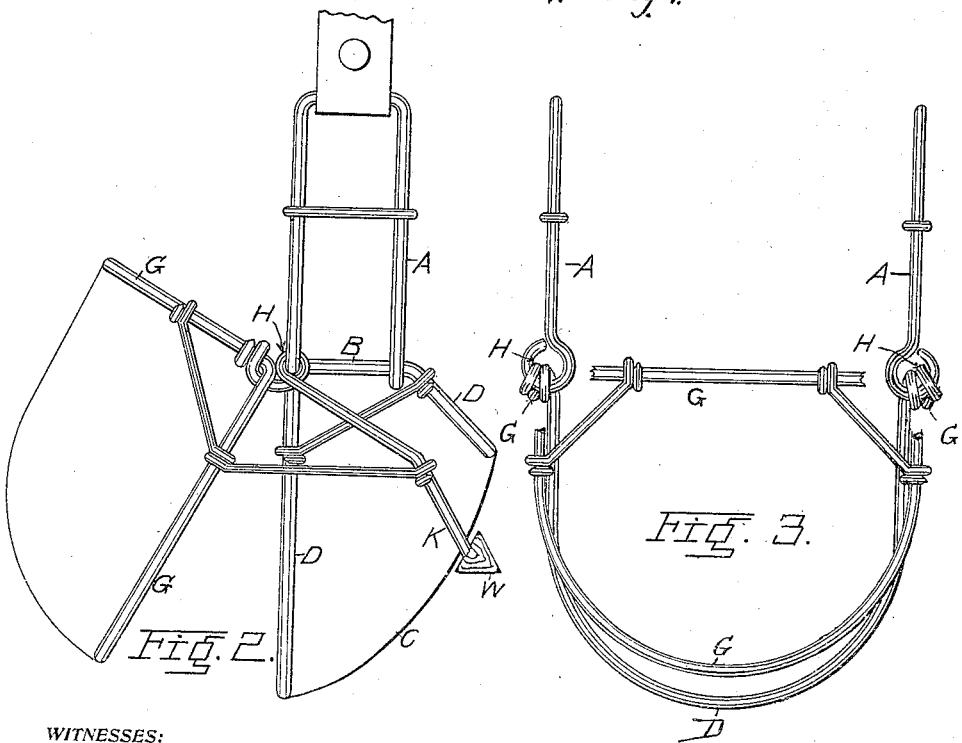
WITNESSES:
Laura Faris
Effie Blackledge
INVENTOR
William H. Lyman
BY
J. H. Haseltine
ATTORNEY

UNITED STATES PATENT OFFICE.

WILLIAM H. LYMAN, OF SPRINGFIELD, MISSOURI.

MUZZLE AND CALF-WEANER.

949,730.  Specification of Letters Patent.  Patented Feb. 15, 1910.

Application filed June 15, 1905. Serial No. 265,424.

*To all whom it may concern:*

Be it known that I, WILLIAM H. LYMAN, a citizen of the United States, residing at Springfield, in the county of Greene and State of Missouri, have invented new and useful Improvements in Muzzles and Calf-Weaners, of which the following is a specification.

My invention relates to improvements in stock muzzles and calf weaners, the object of which is to provide a cheap simple and durable muzzle that will let the animal open the mouth and eat when the mouth or head is turned downward but will close over the mouth when the head is raised up to prevent a calf from sucking and prevent animals from biting and prevent stock from eating fruit from the trees. These objects I attain by means of the device illustrated in the accompanying drawings forming a part of this specification in which—

Figure 1 is a side elevation showing my muzzle and weaner in a horizontal position. Fig. 2, is a side view of the device open. Fig. 3 is a top view of the device showing parts broken away. Fig. 4, shows a view of the weight enlarged.

Similar letters indicate corresponding parts in the several figures.

The side supports A, A are metal loops, secured at the upper ends to a strap going over the head of an animal, the lower ends being attached to the back part B, of the muzzle so as to hold the same rigidly in position. The back part of the muzzle B, forms a basket which is preferably made of wire netting C, having a strong rigid rim D, around its front and upper edges, the same passing through eyes in the lower end of the loops A. The front part of the muzzle also consists of a basket E, also having a rigid rim G, around its back and upper edges. This basket E, is also preferably of wire netting bent to form a basket to receive the nose of the animal. This front basket E, is hinged to a suitable hinge joint, on the side pieces A. This is preferably accomplished by forming a loop in a strong wire H, which is bent into engagement with the rim G, and the same is then extended back and forms a loop K to pass around the back of the basket B, which loop is made large enough to freely operate up and down without coming in contact with the said basket. Said loop is provided with a weight, W, made any desired size and shape for balancing the said basket E, and the said loop is bent down so that when the animal's head is held down the weighted loop K, throws open the front part of the basket. The degree to which the muzzle will open is determined by the size of the loop K, for when the loop is made large it will permit the basket to open wider. When made small or bent downward it will open the basket or permit the same to be opened but a short distance before the loop K, or its weight W, strikes the basket B, and thus prevents the front basket from going farther forward when the animal's head is down. As it approaches the horizontal the weight of the basket E, closes the opening in the muzzle and prevents the animal from biting or eating fruit and a calf or colt from sucking. The bend downward of the loop K, also prevents the said weight W, from opening the front basket when the animal's head is raised.

Having thus described my invention what I claim as new and desire to secure by Letters Patent of the United States is:—

1. A muzzle consisting of a basket adapted to be fixed to an animal's head, a second basket hingedly connected thereto, and means for automatically throwing said hinged basket away from the fixed basket when the animal's head is lowered and for moving the hinged basket when the animal's head is lifted.

2. A muzzle consisting of a basket adapted to be fixed to an animal's head, a second basket hingedly connected thereto and a weight connected to the hinged basket to move said basket away from the fixed basket when the animal's head is lowered and for moving said hinged basket toward said fixed basket when the animal's head is lifted.

In testimony whereof I affix my signature, in presence of two subscribing witnesses.

WILLIAM H. LYMAN.

Witnesses:
S. A. HARDTINE,
EFFIE E. BLACKLEDGE.